US012738086B2

(12) United States Patent
Hirakawa et al.

(10) Patent No.: US 12,738,086 B2
(45) Date of Patent: Sep. 15, 2026

(54) IMAGE PROCESSING APPARATUS, IMAGE PROCESSING METHOD, AND NON-TRANSITORY COMPUTER-READABLE MEDIUM

(71) Applicant: NEC Corporation, Tokyo (JP)

(72) Inventors: Yasufumi Hirakawa, Tokyo (JP); Natsuki Yui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 423 days.

(21) Appl. No.: 18/265,459

(22) PCT Filed: Nov. 11, 2021

(86) PCT No.: PCT/JP2021/041554

§ 371 (c)(1),
(2) Date: Jun. 6, 2023

(87) PCT Pub. No.: WO2022/130849

PCT Pub. Date: Jun. 23, 2022

(65) Prior Publication Data

US 2024/0054804 A1 Feb. 15, 2024

(30) Foreign Application Priority Data

Dec. 14, 2020 (JP) ................................ 2020-206707

(51) Int. Cl.
*G06V 40/10* (2022.01)
*G06T 7/70* (2017.01)
(Continued)

(52) U.S. Cl.
CPC ................ *G06V 40/10* (2022.01); *G06T 7/70* (2017.01); *G06V 10/267* (2022.01); *G06V 10/82* (2022.01);
(Continued)

(58) Field of Classification Search
CPC ...... G06V 40/10; G06V 10/267; G06V 10/82; G06V 10/25; G06V 40/103; G06V 20/52;
(Continued)

(56) References Cited

U.S. PATENT DOCUMENTS

2015/0324990 A1 11/2015 Akama
2016/0379078 A1* 12/2016 Yano ...................... G06T 7/194 382/199
(Continued)

FOREIGN PATENT DOCUMENTS

JP H07-021476 A 1/1995
JP 2005117163 A * 4/2005
(Continued)

OTHER PUBLICATIONS

International Search Report for PCT Application No. PCT/JP2021/041554, mailed on Jan. 25, 2022.
(Continued)

*Primary Examiner* — Delomia L Gilliard
(74) *Attorney, Agent, or Firm* — Sughrue Mion, PLLC

(57) ABSTRACT

An image processing apparatus includes at least one memory storing instructions, and at least one processor. The at least one processor is configured to execute the instructions to acquire image data of a predetermined space captured by a camera, set a mask region in the space, identify a person image being an image of a person included in the image data, estimate a body of the person, based on the person image, perform determination on whether the body of the person with respect to the person image is included in the mask region, perform processing of masking the person, based on a result of the determination by a determination means.

18 Claims, 10 Drawing Sheets

(51) Int. Cl.
*G06V 10/26* (2022.01)
*G06V 10/82* (2022.01)

(52) U.S. Cl.
CPC ............... *G06T 2207/30196* (2013.01); *G06T 2207/30232* (2013.01)

(58) Field of Classification Search
CPC ............. G06T 7/70; G06T 2207/30196; G06T 2207/30232; G06T 7/00; H04N 7/18
See application file for complete search history.

(56) References Cited

U.S. PATENT DOCUMENTS

| | | | | |
|---|---|---|---|---|
| 2019/0200919 | A1* | 7/2019 | Nakao | G16H 30/40 |
| 2020/0104622 | A1* | 4/2020 | Iwamoto | G06V 20/52 |
| 2021/0064857 | A1 | 3/2021 | Semitsu et al. | |

FOREIGN PATENT DOCUMENTS

| | | | | |
|---|---|---|---|---|
| JP | 2007-243509 | A | 9/2007 | |
| JP | 2007-274656 | A | 10/2007 | |
| JP | 2007274655 | A * | 10/2007 | |
| JP | 2016-178517 | A | 10/2016 | |
| JP | 2017-017431 | A | 1/2017 | |
| JP | 2018-137560 | A | 8/2018 | |
| JP | 2020-053955 | A | 4/2020 | |
| WO | 2014/118872 | A1 | 8/2014 | |
| WO | 2017/222072 | A1 | 12/2017 | |
| WO | WO-2018154827 | A1 * | 8/2018 | H04N 23/60 |
| WO | 2019/220589 | A1 | 11/2019 | |

OTHER PUBLICATIONS

JP Office Communication for JP Application No. 2022-569776, malled on Jun. 25, 2024 with English Translation.
JP Office Action for JP Application No. 2024-118752, mailed on Aug. 26, 2025 with English Translation.
JP Office Action for JP Application No. 2024-118752, mailed on Feb. 3, 2026 with English Translation.

* cited by examiner

IMAGE PROCESSING APPARATUS, IMAGE PROCESSING METHOD, AND NON-TRANSITORY COMPUTER-READABLE MEDIUM

This application is a National Stage Entry of PCT/JP2021/041554 filed on Nov. 11, 2021, which claims priority from Japanese Patent Application 2020-206707 filed on Dec. 14, 2020, the contents of all of which are incorporated herein by reference, in their entirety.

TECHNICAL FIELD

The present invention relates to an image processing apparatus, an image processing method, and a non-transitory computer-readable medium.

BACKGROUND ART

A technique for masking a person included in a specified region of a captured image has been developed.

Related to such a technique, for example, Patent Literature 1 describes a technique for detecting a person image from video information by a surveillance camera, and determining whether a person has stepped into a surveillance space.

In addition, Patent Literature 2 describes a technique for detecting a detection target by setting a criterion of a first step of whether a part of an object in a video is included in a range of a surveillance region and a criterion of a predetermined second step, and determining whether to be matched with the criterion.

CITATION LIST

Patent Literature

[Patent Literature 1] International Patent Publication No. WO2019/220589

[Patent Literature 2] International Patent Publication No. WO2014/118872

SUMMARY OF INVENTION

Technical Problem

However, when a person included in a specified region being set in an image is masked, an unintended person may be included in a mask target depending on a position of a camera or a position of a capturing target.

The present disclosure has been made in view of such a problem, and an object thereof is to provide a technique for appropriately masking a person included in a mask region.

Solution to Problem

An image processing apparatus according to one example embodiment of the present disclosure includes an image data acquisition means, a mask region setting means, an identification means, a body estimation means, a determination means, and a processing means. The image data acquisition means acquires image data of a predetermined space captured by a camera. The mask region setting means sets a mask region in the space. The identification means identifies a person image being an image of a person included in the image data. The body estimation means estimates a body of the person, based on the person image. The determination means determines whether the body of the person related to the person image is included in the mask region. The processing means performs processing of masking the person, based on a result of the determination by the determination means.

A method according to one example embodiment of the present disclosure executes the following method by a computer. The computer acquires image data of a predetermined space captured by a camera. The computer sets a mask region in the space. The computer identifies a person image being an image of a person included in the image data. The computer estimates a body of the person, based on the person image. The computer determines whether the body of the person related to the person image is included in the mask region. The computer performs processing of masking the person, based on a determination result.

A program according to one example embodiment of the present disclosure causes a computer to execute the following steps. The computer acquires image data of a predetermined space captured by a camera. The computer sets a mask region in the space. The computer identifies a person image being an image of a person included in the image data. The computer estimates a body of the person, based on the person image. The computer determines whether the body of the person related to the person image is included in the mask region. The computer performs processing of masking the person, based on a determination result.

Advantageous Effect of Invention

According to the present disclosure, it is possible to provide an image processing apparatus or the like that appropriately masks a person included in a mask region.

EXAMPLE EMBODIMENT

Figure 1:
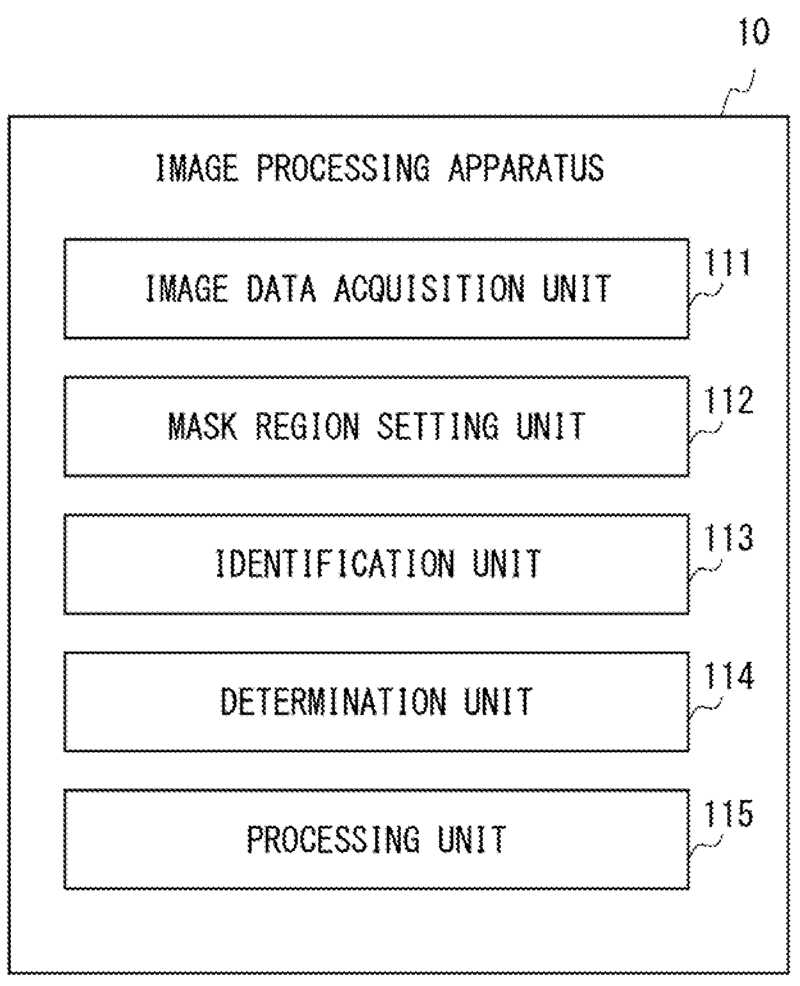
FIG. 1 is a block diagram of an image processing apparatus according to a first example embodiment.

Hereinafter, the present invention will be described through example embodiments of the invention, but the invention according to the claims is not limited to the following example embodiments. In addition, not all of the components described in the example embodiments are essential as means for solving the problem. For clarity of explanation, the following description and the drawings are omitted and simplified as appropriate. Note that, in the drawings, the same elements are denoted by the same reference signs, and redundant descriptions are omitted as necessary.

First Example Embodiment

Hereinafter, an example embodiment of the present invention will be described with reference to the drawings. FIG. 1 is a block diagram of an image processing apparatus 10 according to a first example embodiment. The image processing apparatus 10 illustrated in FIG. 1 is used by being communicably connected to a camera installed in a predetermined facility or outdoors. The image processing apparatus 10 includes a function of performing mask processing on image data. The mask processing is processing of extracting a part of an image and masking the extracted image. The "processing of masking" according to the present example embodiment is processing in which, for example, processing performed on an extracted image and processing performed on a non-extracted image are different from each other. The image processing apparatus according to the present example embodiment performs processing of masking a person according to a predetermined condition from a captured image data. The image processing apparatus 10 includes, as a main component, an image data acquisition unit 111, a mask region setting unit 112, an identification unit 113, a determination unit 114, and a processing unit 115.

The image data acquisition unit 111 acquires image data of a predetermined space captured by a camera. One camera or a plurality of cameras may be connected to the image data acquisition unit 111. In addition, the camera to which the image data acquisition unit 111 is connected may be fixed in order to capture a predetermined angle of view, or may be a movable camera that performs a pan, a tilt, or a zoom. The image data acquisition unit 111 supplies image data acquired from the camera to each component as appropriate.

The mask region setting unit 112 sets a mask region in the predetermined space with respect to image data acquired by the image data acquisition unit 111. The mask region is a closed region to be set in an image. The image processing apparatus 10 performs processing of masking a person in a case where it is determined that the person exists in a mask region according to a predetermined condition. The mask region setting unit 112 may set a predetermined region as a mask region, or may set a mask region according to an operation of a user who uses the image processing apparatus 10. In addition, the mask region setting unit 112 may set a mask region associated to a predetermined condition according to the condition. The mask region setting unit 112 supplies information on the set mask region to the determination unit 114.

The identification unit 113 receives image data acquired by the image data acquisition unit 111, and identifies a person image included in the received image data. The person image is an image including a person. The identification unit 113 searches for a region having a feature amount that matches a feature amount of the person image by performing convolution processing on the image data, for example. Then, the identification unit 113 identifies a region that matches the feature amount of the person image as the person image. The identification unit 113 supplies information on the region of the image identified as the person image to the determination unit 114.

The determination unit 114 receives information on a mask region in image data from the mask region setting unit 112. In addition, the determination unit 114 receives information on a region of a person image in the image data from the identification unit 113. Then, the determination unit 114 determines whether the person image is included in the mask region with respect to the image data acquired by the image data acquisition unit 111. The determination unit 114 supplies a determination result to the processing unit 115 as information on a result of the determination.

The processing unit 115 receives a determination result from the determination unit 114, and performs processing of masking a person according to the received determination result. The processing of masking a person may be image processing on a person image related to mask processing, or may be arithmetic processing on a person image related to mask processing. For example, the processing of masking a person may be image processing such as processing of filling a person image related to the mask processing or removing, based on a background difference, a person image. In addition, for example, the processing of masking a person may be arithmetic processing such as not including a person related to the mask processing when calculating the number of persons included in the image.

Figure 2:
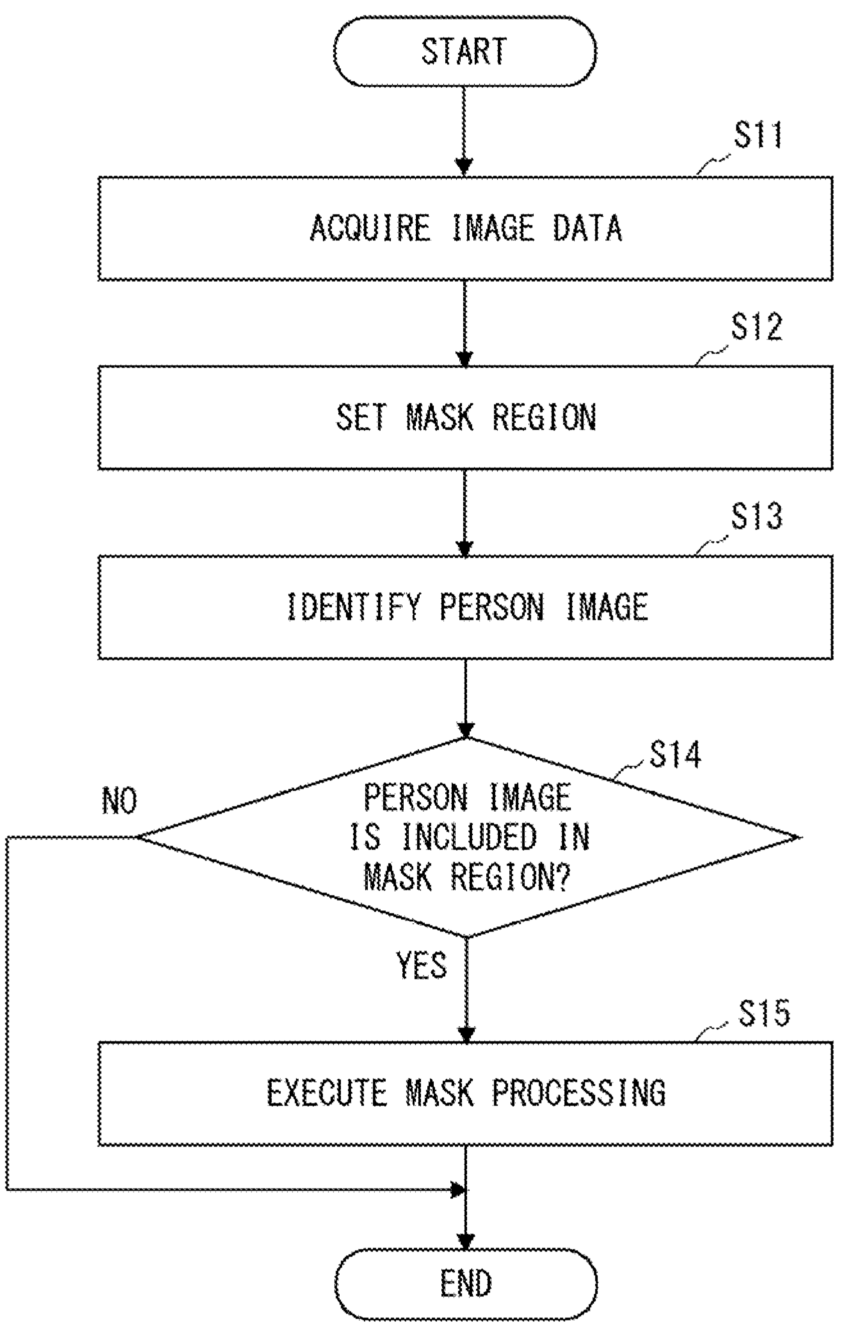
FIG. 2 is a flowchart illustrating an image processing method according to the first example embodiment.

FIG. 2 is a flowchart illustrating an image processing method according to the first example embodiment. The flowchart illustrated in FIG. 2 is started by, for example, activating the image processing apparatus 10.

First, the image data acquisition unit 111 of the image processing apparatus 10 acquires image data of a predetermined space captured by a camera (step S11). The image data acquisition unit 111 appropriately supplies the acquired image data to each component being included in the image processing apparatus 10.

Next, the mask region setting unit 112 sets a mask region in a predetermined space of the image data (step S12). The mask region setting unit 112 supplies information on the mask region to the determination unit 114.

Next, the identification unit 113 identifies a person image being an image of a person included in the image data (step S13). The identification unit 113 supplies information on the identified person image to the determination unit 114.

Next, the determination unit 114 determines whether the person image is included in the mask region (step S14). When it is not determined that the person image is included in the mask region (step S14: NO), the image processing apparatus 10 ends the flowchart without executing mask processing. When it is determined that the person image is included in the mask region (step S14: YES), the image processing apparatus 10 proceeds to step S15.

In step S15, the processing unit 115 performs processing of masking a person included in the mask region according to a determination result (step S15). When the processing unit 115 finishes executing the mask processing, the image processing apparatus 10 ends a series of processing.

Note that, the above-described processing may be executed every time when image data is supplied from a camera to the image processing apparatus 10. In addition, in the above-described processing, order of step S12 and step S13 may be reversed. In addition, step S12 and step S13 may be performed in parallel.

The image processing apparatus according to the first example embodiment has been described above. Note that, the image processing apparatus 10 includes a processor and a storage apparatus as a not-illustrated component. The storage apparatus included in the image processing apparatus 10 includes, for example, a storage apparatus including a non-volatile memory such as a flash memory or a solid state drive (SSD). In this case, the storage apparatus included in the image processing apparatus 10 stores a computer program (hereinafter, also simply referred to as a program) for executing the above-described image processing method. In addition, the processor reads the computer program from the storage apparatus into a buffer memory such as a dynamic random access memory (DRAM), and executes the program.

Each component included in the image processing apparatus 10 may be achieved by each of pieces of dedicated hardware. In addition, some or all of the constituent elements may be achieved by general-purpose or dedicated circuitry, a processor, or the like, or a combination thereof. These may be constituted by a single chip, or may be constituted by a plurality of chips connected via a bus. Some or all of the constituent elements of each apparatus may be achieved by a combination of the above-described circuitry or the like and a program. In addition, as the processor, a central processing unit (CPU), a graphics processing unit (GPU), a field-programmable gate array (FPGA), or the like can be used. Note that, the description of the component described herein may also be applied to another apparatus or system described below in the present disclosure.

In addition, when some or all of the constituent elements of the image processing apparatus 10 are achieved by a plurality of information processing apparatuses, pieces of circuitry, and the like, the plurality of information processing apparatuses, pieces of circuitry, and the like may be centralizedly arranged, or may be distributedly arranged. For example, the information processing apparatus, the circuitry, and the like may be achieved as a form, such as a client server system or a cloud computing system, in which each of them is connected via a communication network to each other. In addition, the function of the image processing apparatus 10 may be provided in a software as a service (SaaS) form.

The first example embodiment has been described above. The image processing apparatus 10 according to the first example embodiment identifies a person image from image data, and performs mask processing when the identified person image is included in a mask region. Therefore, according to the first example embodiment, it is possible to provide an image processing apparatus or the like that appropriately masks a person included in a mask region.

Second Example Embodiment

Figure 3:
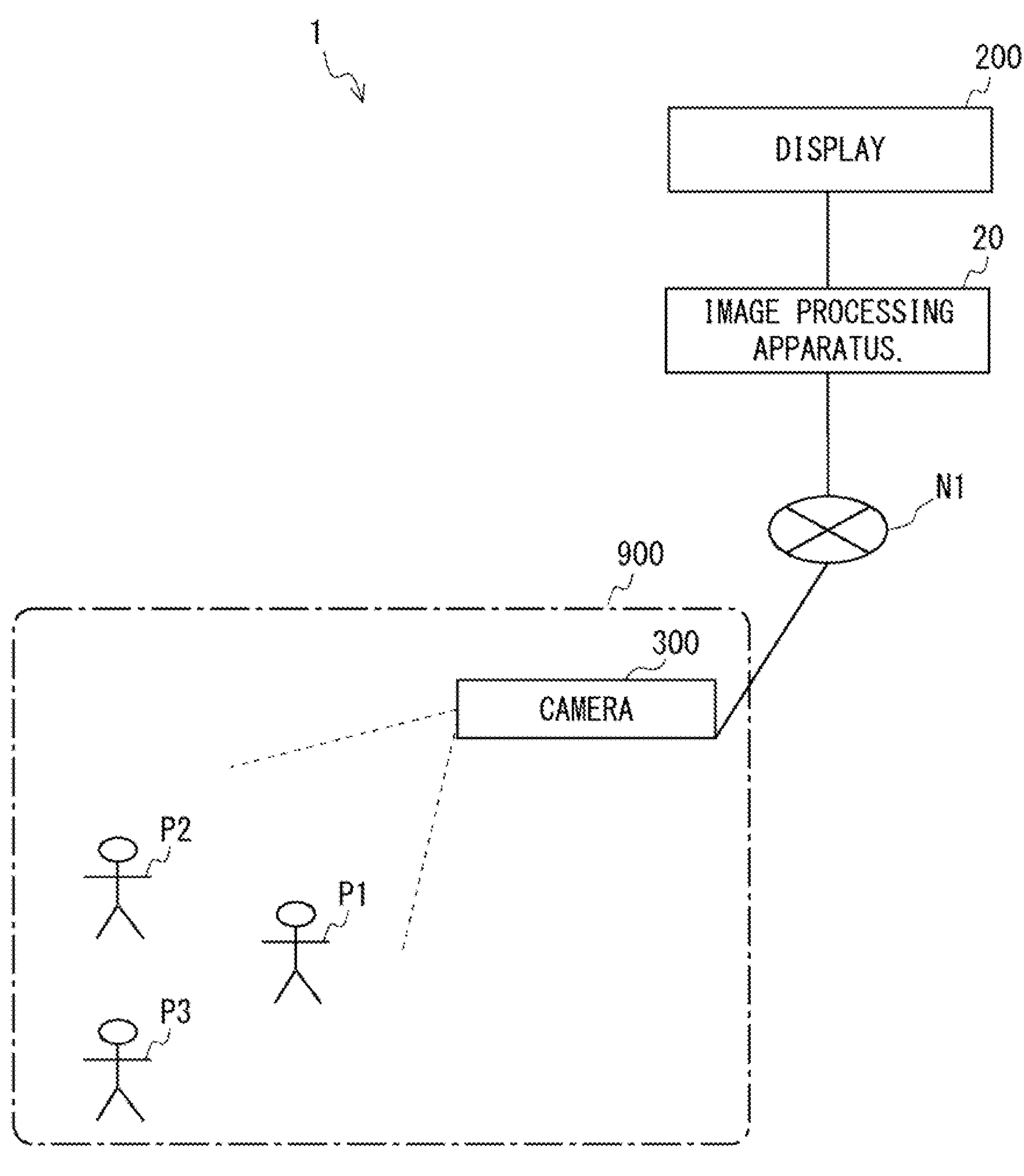
FIG. 3 is a block diagram of an image processing system according to a second example embodiment.

Next, a second example embodiment will be described. FIG. 3 is a block diagram of an image processing system 1 according to the second example embodiment. The image processing system 1 illustrated in FIG. 3 includes an image processing apparatus 20, a display 200, and a camera 300.

The image processing apparatus 20 is communicably connected to the camera 300 via a network N1 being a communication network, and acquires image data generated by the camera 300. In addition, the image processing apparatus is communicably connected to the display 200, and displays a result of mask processing on the display 200. The network N1 may be a local area network (LAN), or may be a wide area network (WAN).

The display 200 is, for example, a liquid crystal display or a display apparatus including organic electroluminescence. The display 200 is communicably connected to the image processing apparatus 20, receives image data from the image processing apparatus 20, and displays the received image data. Note that, in the example illustrated in FIG. 3, the image processing apparatus 20 and the display 200 are connected to each other without using the network N1, but may be connected to each other via the network N1. By visually recognizing an image displayed on the display 200 by a user of the image processing system 1, the user can recognize a result of image processing executed by the image processing apparatus 20.

The camera 300 is fixed at a predetermined position of a facility 900, and captures a landscape in the facility. The camera 300 is communicably connected to the image processing apparatus 20 via the network N1. For example, the camera 300 captures an image of 30 frames per second, and supplies image data related to the captured images to an image data acquisition unit 111. As illustrated in the figure, for example, the camera 300 captures a landscape in which a person P1, a person P2, and a person P3 exist in an angle of view indicated by a dotted line, generates image data, and supplies the generated image data to the image processing apparatus 20.

Figure 4:
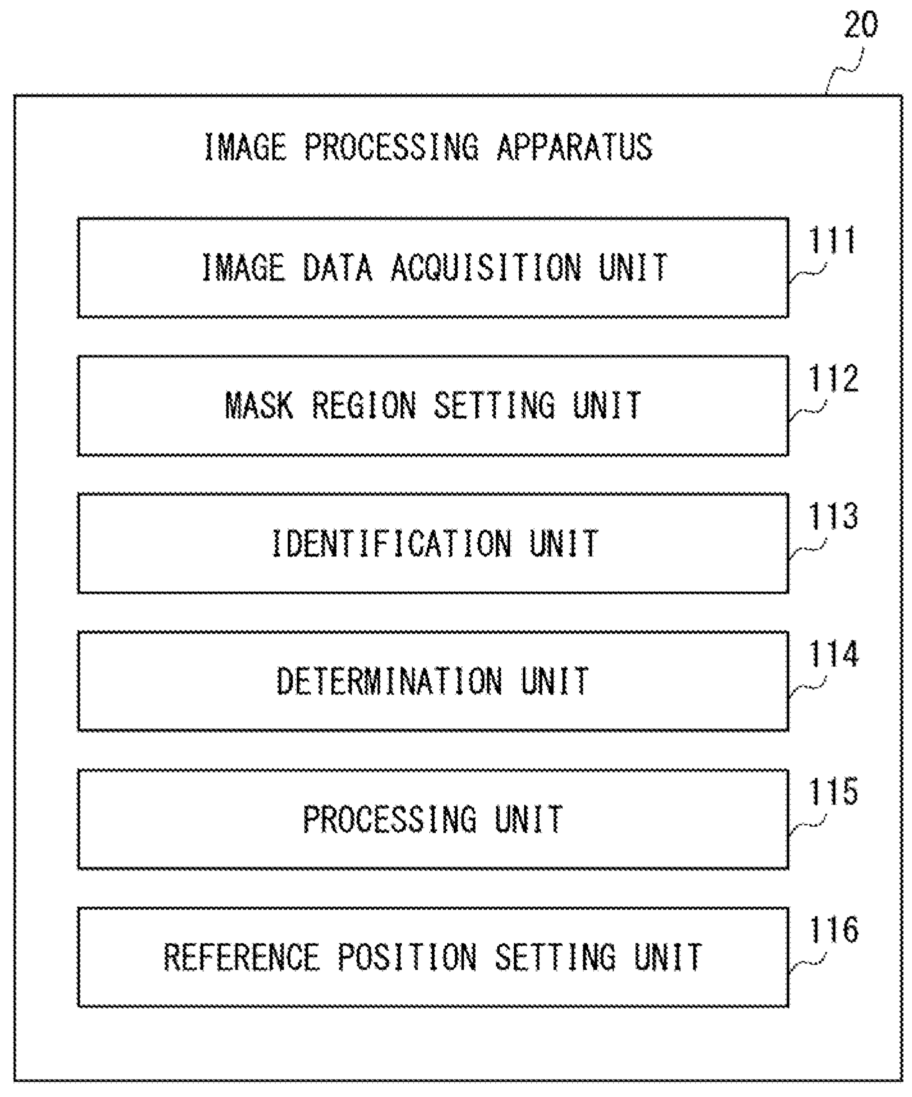
FIG. 4 is a block diagram of an image processing apparatus according to the second example embodiment.

Next, the image processing apparatus 20 will be further described with reference to FIG. 4. FIG. 4 is a block diagram of the image processing apparatus 20 according to the second example embodiment. The image processing apparatus 20 is different from the image processing apparatus 10 according to the first example embodiment in that the image processing apparatus 20 includes a reference position setting unit 116.

The image data acquisition unit 111 acquires a plurality of pieces of image data from the camera 300. The plurality of pieces of image data are image data captured at different times. For example, the image data acquisition unit 111 receives image data from a camera having 30 frames per second every one-thirtieth seconds.

A mask region setting unit 112 according to the present example embodiment sets a mask region in a virtual horizontal plane being set to a predetermined height in a space captured by the camera 300. At this time, the predetermined height may be set by a user, for example. In addition, the mask region setting unit 112 may estimate a floor surface in a space related to image data, and set a mask region on the estimated floor surface. With such a configuration, the image processing apparatus 20 can easily set when a user sets a mask region. In addition, by combining with a reference position described later, the image processing apparatus 20 can easily determine whether a person has entered a predetermined mask region.

An identification unit 113 according to the present example embodiment identifies a person image as an image of a moving person. Therefore, the identification unit 113 first acquires a plurality of pieces of image data generated at different times from the image data acquisition unit 111. Next, the identification unit 113 derives, for example, a difference between pixels associated to each of the plurality of pieces of image data. As a result, the identification unit 113 detects an image of a moving object. Further, the identification unit 113 identifies a person image from the image of the moving object. Note that, a method of identifying an image of a moving person by the identification unit 113 is not limited to the above-described method. For example, the identification unit 113 may detect a person image for a moving person by detecting a person image for each piece of image data received from the image data acquisition unit 111, and deriving a difference from a frame before or after the image in which the person image is detected.

The identification unit 113 may be a unit that identifies a person image via a learner for identifying that an extracted image data is a person image. In this case, the learner may be equipment that calculates a feature amount of the extracted image data, and detects that the calculated feature amount is similar to a feature amount of a person image. Such a learner may be equipment that uses, for example, histograms of oriented gradients (HOG) or a support vector machine.

In addition, the identification unit 113 may identify a person image via a learner including a neural network having a multilayer structure. In this case, the identification unit 113 may be a unit that includes a learner performing deep learning. Note that, the learner performing deep learning is also referred to as a learned model. The identification unit 113 may be a unit that includes such a learned model, or may include a structure being communicably connected to a learned model existing outside the image processing apparatus 20.

In addition, the identification unit 113 may be a unit that identifies a circumscribed rectangle being in contact with an outside of a person. In other words, the identification unit 113 identifies a rectangular image including a person image as a person image. In this case, the identification unit 113 extracts a predetermined rectangular image related to image data acquired from the camera, and determines whether the extracted rectangular image is a person image. As a result, the identification unit 113 can simplify or speed up processing of identifying a person image. When the identification unit 113 identifies a circumscribed rectangle, a determination unit 114 determines whether the circumscribed rectangle is included in a mask region.

The reference position setting unit 116 according to the present example embodiment sets a reference position related to a person image. For example, the reference position setting unit 116 sets a reference position at a predetermined position of the circumscribed rectangle. The predetermined position of the circumscribed rectangle is, for example, a center position of a lower end of the rectangle. Alternatively, the predetermined position of the circumscribed rectangle is, for example, a center position of the rectangle. By setting the reference position, the determination unit 114 can determine whether the reference position is included in a mask region. Alternatively, by setting the reference position at, for example, a lower end portion of a person image and setting a mask region at a predetermined range on a floor surface, the image processing apparatus 20 can easily determine whether a person has entered the predetermined mask region. Note that, the reference position to be set by the reference position setting unit 116 may be a region having a predetermined range, or may be a position that specifies a pixel at a predetermined position. In addition, the reference position may be one or plural.

When determining whether a person image is included in a mask region, the determination unit 114 according to the present example embodiment may determine, for example, whether a circumscribed rectangle is included in the mask region. Alternatively, the determination unit 114 according to the present example embodiment may determine whether a reference position related to the person image is included in the mask region. In addition, the determination unit 114 may perform setting for such determination by a user operation, a predetermined condition, or the like.

Figure 5:
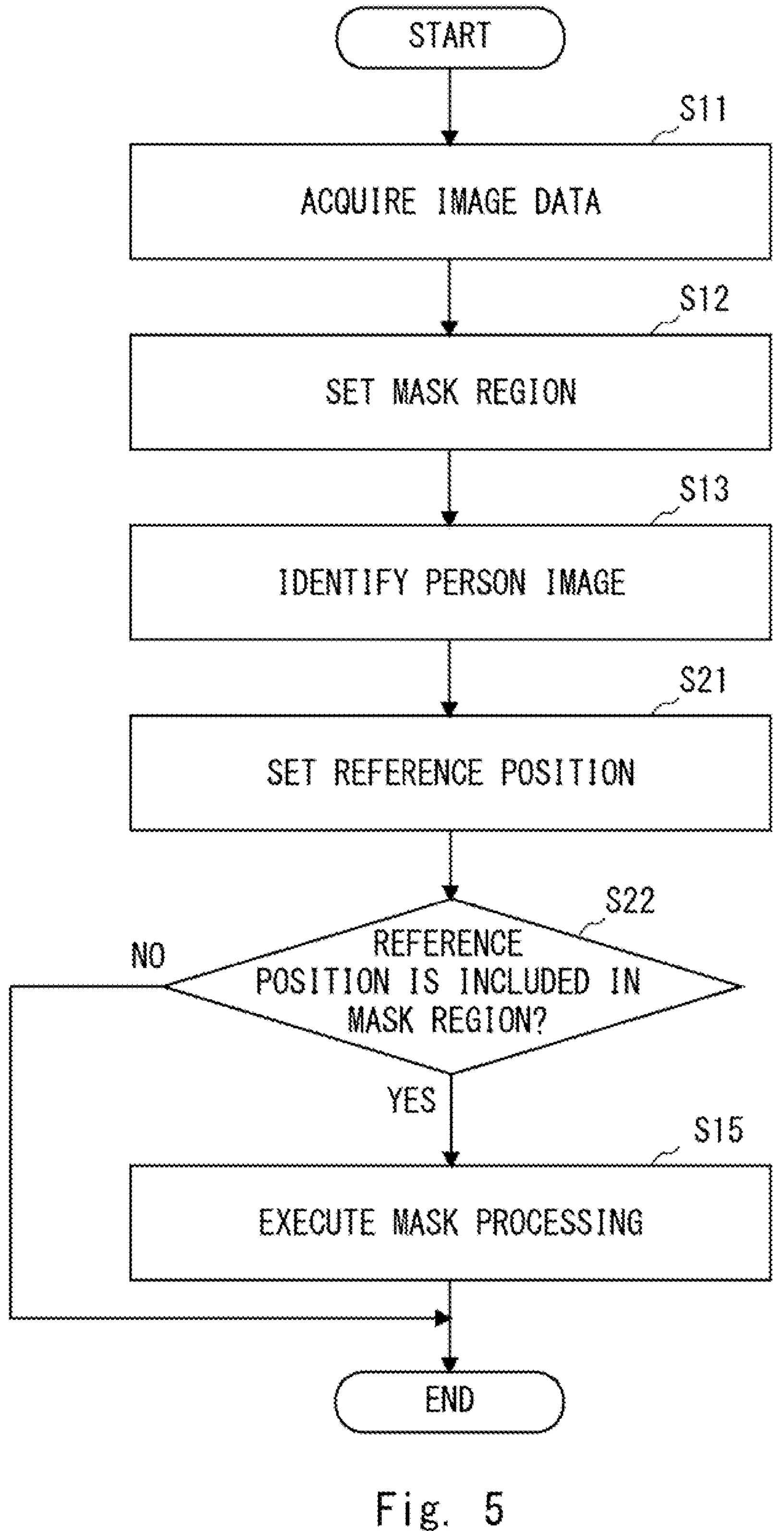
FIG. 5 is a flowchart of the image processing apparatus according to the second example embodiment.

Next, processing executed by the image processing apparatus 20 will be described with reference to FIG. 5. FIG. 5 is a flowchart of an image processing apparatus according to the second example embodiment. The example illustrated in FIG. 5 is an example that determines whether a reference position set by the reference position setting unit 116 is included in a mask region. The flowchart illustrated in FIG. 5 is different from the flowchart according to the first example embodiment in processing between step S13 and step S15.

In step S13, the identification unit 113 identifies a person image included in image data (step S13). Herein, the identification unit 113 identifies a circumscribed rectangle as a person image. The identification unit 113 supplies information on the identified person image to the reference position setting unit 116.

Next, the reference position setting unit 116 sets a reference position related to the person image (step S21). The reference position setting unit 116 supplies information on the set reference position to the determination unit 114.

Next, the determination unit 114 determines whether the reference position set in the person image is included in a mask region (step S22). When it is not determined that the reference position is included in the mask region (step S22: NO), the image processing apparatus 20 ends the flowchart without executing mask processing. When it is determined that the reference position is included in the mask region (step S22: YES), the image processing apparatus 20 proceeds to step S15, and a processing unit 115 performs processing of masking a person included in the mask region according to a determination result (step S15). When the processing unit 115 finishes executing the mask processing, the image processing apparatus 20 ends a series of processing.

Figure 6:
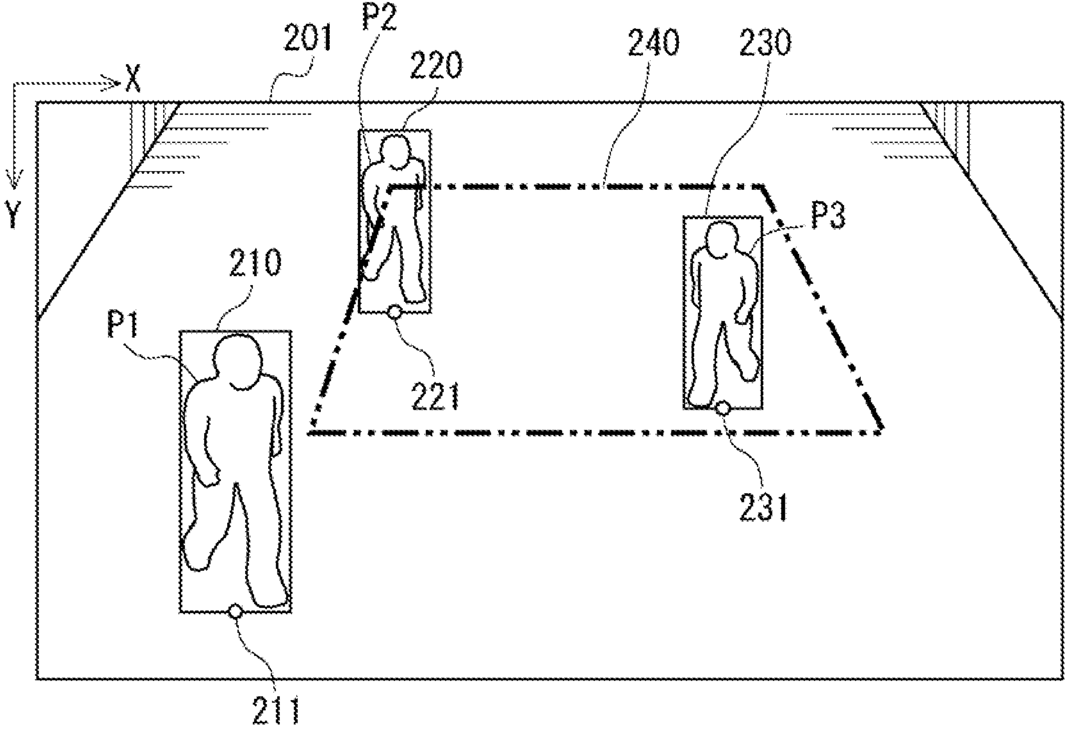
FIG. 6 is a diagram illustrating an example of an image processed by the image processing apparatus according to the second example embodiment.

Next, an example of image data processed by the image processing apparatus 20 will be described with reference to FIG. 6. FIG. 6 is a diagram illustrating an example of an image processed by the image processing apparatus 20 according to the second example embodiment. In FIG. 6, an image 201 is illustrated. The image 201 is an example of an image displayed on the display 200. The image 201 indicates a scene of the facility 900 captured by the camera 300, which a situation in which the person P1, the person P2, and the person P3 are walking.

In the image 201, a first mask region 240 set by the mask region setting unit 112 is indicated by a thick two-dot chain line. The first mask region 240 is set on a floor surface in a space related to the image 201. Therefore, as illustrated in the figure, the first mask region 240 is displayed in such a way that a front side (lower portion of the image 201) of the space related to the image is wider than a back side (upper portion of the image 201) of the space related to the image. The mask region setting unit 112 analyzes image data received from the image data acquisition unit 111, and thus can virtually set a depth of the space.

An image of the person P1 included in the image 201 is a first person image 210. The first person image 210 includes a circumscribed rectangle being set around the person P1. At a lower end of the first person image 210, a first reference point 211 is indicated. Similarly, an image of the person P2 is a second person image 220, and includes a circumscribed rectangle being set around the person P2 and a second reference point 221 being set at a lower end of the second person image 220. In addition, an image of the person P3 is a third person image 230, and includes a circumscribed rectangle being set around the person P3 and a third reference point 231 being set at a lower end of the third person image 230. As described above, in the example illustrated in FIG. 6, when a person is identified, the identification unit 113 identifies a person image by a circumscribed rectangle.

In addition, the reference position setting unit 116 sets a reference position at a center of a lower end of the circumscribed rectangle.

When the identification unit 113 identifies a person image and sets a circumscribed rectangle, the identification unit 113 analyzes, for example, whether a person image of a predetermined size exists in the image 201 by convolution processing. In the image 201, for example, an upper left of the image is an origin, a horizontal direction from left to right is an X-axis, and a vertical direction from top to bottom is a Y-axis. In this case, for example, the identification unit 113 performs analysis processing on the image in an X-plus direction from the origin, causes the Y-axis to move in a plus direction when the processing is completed to a right end, and performs analysis processing again in the X-plus direction from a left end.

At this time, the identification unit 113 may change a size of the rectangle at a time of analysis according to the depth of the image 201. In other words, the identification unit 113 performs identification of the person image with a relatively small size toward an upper side of the image 201, that is, toward a back side of the space, and performs identification of the person image with a relatively large size toward a lower side of the image 201, that is, toward the front side of the space. By such processing, the identification unit 113 can efficiently identify the person image.

In the example illustrated in FIG. 6, the first mask region 240 does not include the first person image 210 at all, includes a lower portion of the second person image 220, and includes the entire third person image 230. In such a situation, the determination unit 114 does not determine that at least the first person image 210 is included in the first mask region 240.

When a setting of the determination unit 114 is a setting of performing mask processing when including the entire circumscribed rectangle, the determination unit 114 determines that the third person image 230 is included in the first mask region 240, and does not determine that the second person image 220 is included in the first mask region 240. In this case, the processing unit 115 performs mask processing on the third person image 230.

When the setting of the determination unit 114 is a setting of performing the mask processing when including a reference position, the determination unit 114 determines that the second person image 220 and the third person image 230 are included in the first mask region 240. In this case, the processing unit 115 performs mask processing on the second person image 220 and the third person image 230.

The second example embodiment has been described above. The image processing apparatus 20 according to the second example embodiment determines whether an identified person image is included in a mask region according to a predetermined condition. Therefore, according to the second example embodiment, it is possible to provide an image processing apparatus or the like that appropriately masks a person included in a mask region.

Third Example Embodiment

Figure 7:
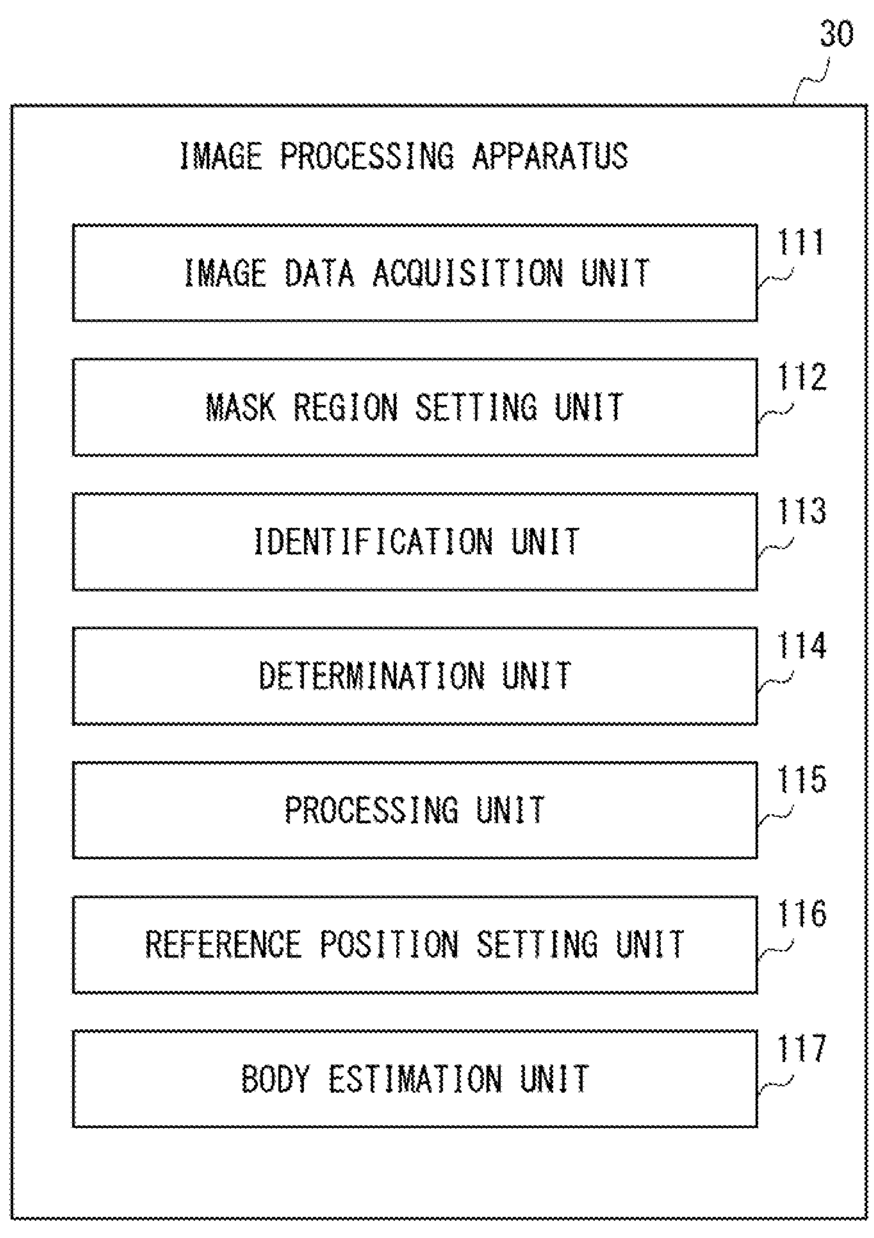
FIG. 7 is a block diagram of an image processing apparatus according to a third example embodiment.

Next, a third example embodiment will be described. The third example embodiment is different from the above-described example embodiments in that it has a function of estimating a body of a person. FIG. 7 is a block diagram of an image processing apparatus 30 according to the third example embodiment. The image processing apparatus 30 includes a body estimation unit 117 in addition to the above-described component.

The body estimation unit 117 receives a person image identified by an identification unit 113, and estimates a body of a person from the received person image. The "body of the person" according to the present example embodiment refers to modeled structure of main structure forming a body of a person.

For example, the body estimation unit 117 estimates a position of a main joint of a person from a person image. In addition, in this case, the body estimation unit 117 may connect related joints to each other from the estimated position of the joint, and estimate a pose of a person.

In addition, for example, the body estimation unit 117 may estimate a position and a pose of a main portion (a head portion, a torso portion, an arm portion, a leg portion, and the like) of a person from a person image. In addition, in this case, the body estimation unit 117 may estimate a joint point connecting the main portions to each other from the estimated position of the pose of the body.

The body estimation unit 117 may estimate a body by complementing a body of a person not included in a person image from the person image. For example, when any object exists at a foot of a person captured by a camera, a person image included in image data does not include the foot of the person. Herein, the body estimation unit 117 stores ratio information of a size of each portion in a general human body. Therefore, the body estimation unit 117 can complement the body of the person in the person image with reference to the ratio information.

Note that, the body estimation unit 117 may estimate a pose of a person by calculating a feature amount of a main portion in a person image. In addition, the body estimation unit 117 may use a learned model that has performed predetermined learning when estimating the pose from the person image.

A determination unit 114 according to the present example embodiment may be a unit that determines whether a body of a person is included in a mask region. In this case, the determination unit 114 may be a unit that determines whether a preset portion of the body of the person is included in the mask region. In addition, the determination unit 114 may be a unit that determines whether a reference position being set by a reference position setting unit 116 is included in the mask region.

The reference position setting unit 116 according to the present example embodiment may be a unit that receives information on a body of a person and sets a reference position in a predetermined portion of the person from the received information on the body. For example, the reference position setting unit 116 may be a unit that sets a reference position at a foot of a person. More specifically, for example, the reference position setting unit 116 may be a unit that sets a reference position including an intersection point between a straight line connecting a right foot and a left foot of a person, and a straight line along a spine of the person. The reference position setting unit 116 is not limited to the above-described content, and may set a predetermined position of a person to a reference position.

A mask region setting unit 112 according to the present example embodiment can set a plurality of mask regions. In addition, in a case where a plurality of mask regions are set, the determination unit 114 according to the present example embodiment can determine whether a person image is included in each of the mask regions according to individual conditions. In other words, when the mask region setting unit 112 sets, for example, a first mask region and a second mask region being different from the first mask region, the determination unit 114 determines, for the first mask region, whether a person image is included in the first mask region according to a predetermined first condition. In addition, the determination unit 114 determines, for the second mask region, whether a person image is included in the second mask region according to a second condition being different from the first condition.

Figure 8:
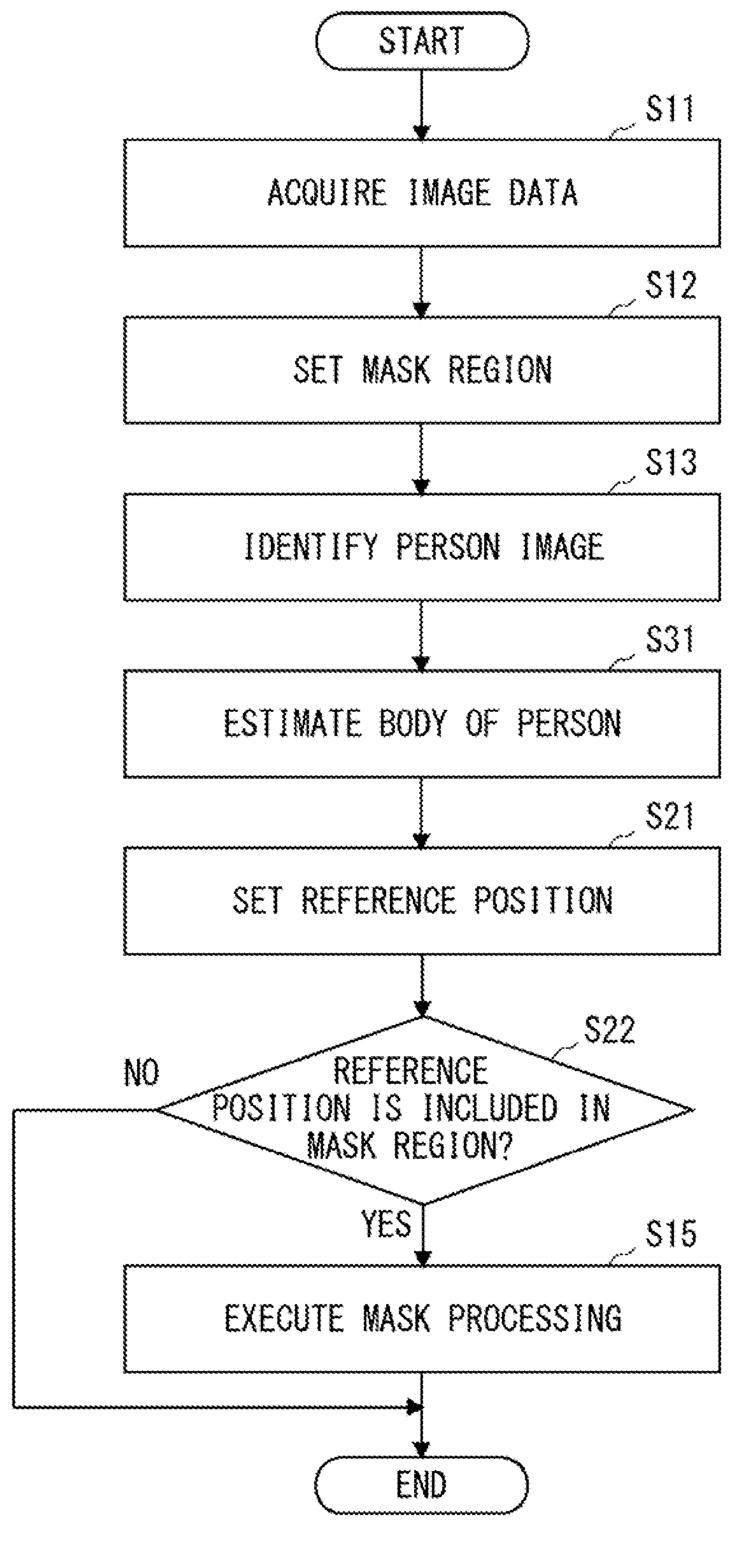
FIG. 8 is a flowchart of an image processing apparatus according to the third example embodiment.

Next, an image processing method according to the third example embodiment will be described with reference to FIG. 8. FIG. 8 is a flowchart of an image processing apparatus according to the third example embodiment. The flowchart illustrated in FIG. 8 is different from the flowchart described in FIG. 5 in that step S31 exists between step S13 and step S21.

In step S13, the identification unit 113 identifies a person image included in image data (step S13). The identification unit 113 supplies information on the identified person image to the body estimation unit 117.

Next, the body estimation unit 117 estimates a body of a person from the received information on the person image (step S31). The body estimation unit 117 supplies information on estimation of the body of the person to the reference position setting unit 116.

The reference position setting unit 116 sets a reference position related to the person image from the information received from the body estimation unit 117 (step S21). The reference position setting unit 116 supplies information on the set reference position to the determination unit 114.

Next, the determination unit 114 determines whether the reference position related to the body of the person is included in a mask region (step S22). When it is not determined that the reference position is included in the mask region (step S22: NO), the image processing apparatus 30 ends the flowchart without executing mask processing. When it is determined that the reference position is included in the mask region (step S22: YES), the image processing apparatus 30 proceeds to step S15, and a processing unit 115 performs processing of masking a person included in the mask region according to a determination result (step S15). When the processing unit 115 finishes executing the mask processing, the image processing apparatus 30 ends a series of processing.

Figure 9:
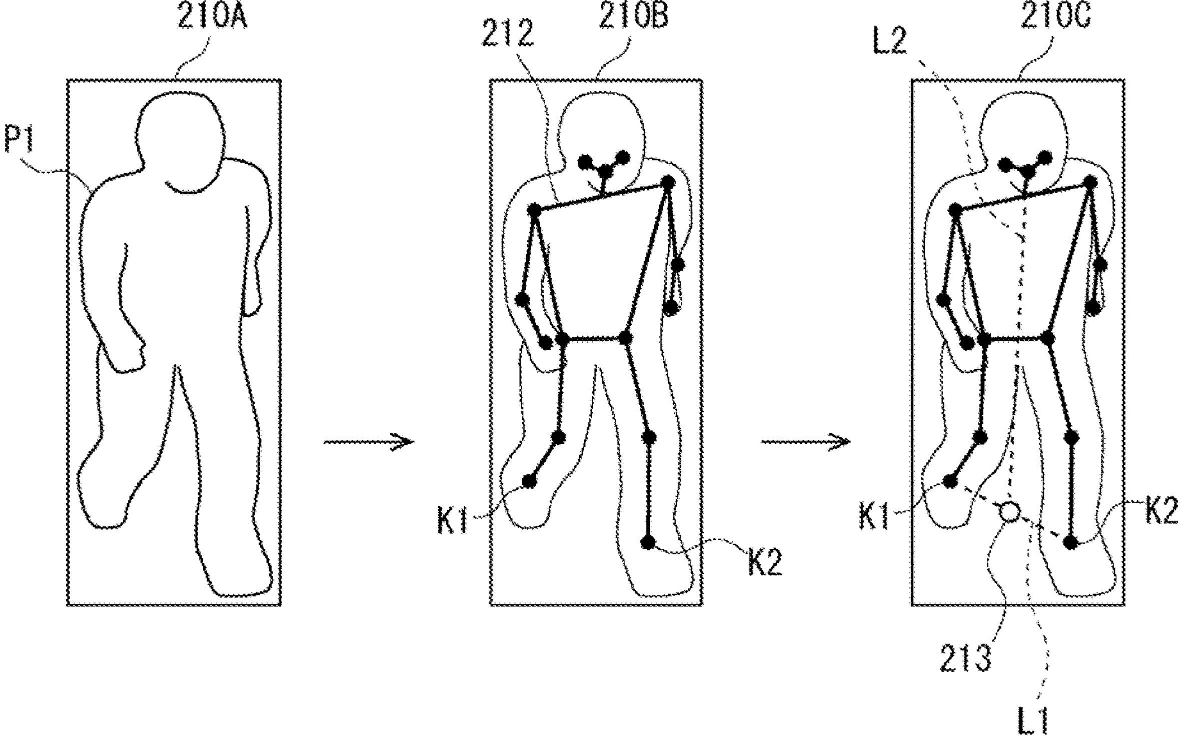
FIG. 9 is a diagram illustrating an example of an image processed by the image processing apparatus according to the third example embodiment.

Next, a specific example of processing performed by the identification unit 113, the reference position setting unit 116, and the body estimation unit 117 will be described with reference to FIG. 9. FIG. 9 is a diagram illustrating an example of a person image processed by the image processing apparatus 30 according to the third example embodiment.

FIG. 9 illustrates a person image 210A, a person image 210B, and a person image 210C being three person images related to a person P1 in order from left to right along progress of processing. The person image 210A is an image being set by the identification unit 113 identifying a person from the image data.

On a right side of the person image 210A, the person image 210B is illustrated. In the person image 210B, a first body image 212 is superimposed on the person image 210A. The body estimation unit 117 estimates a body of the person P1 from the person image 210B, and generates the first body image 212. The first body image 212 includes a plurality of joint points. In addition, the first body image 212 includes a plurality of straight lines connecting two different joint points to each other.

The reference position setting unit 116 can set the joint point included in the first body image 212 as a reference position. For example, the reference position setting unit 116 sets a right foot joint point K1 or a left foot joint point K2 of the person P1 as the reference position. In this case, the determination unit 114 determines whether the right foot joint point K1 or the left foot joint point K2 is included in a mask region. Note that, the reference position setting unit 116 may set a plurality of joint points as reference positions. For example, the reference position setting unit 116 may set the right foot joint point K1 and the left foot joint point K2 of the person P1 as the reference position. In this case, the determination unit 114 determines whether both the right foot joint point K1 and the left foot joint point K2 are included in the mask region. In other words, the reference position setting unit 116, not limited to the above-described example, can set one or more joint points as the reference position. Then, the determination unit 114 determines whether the joint point being set as the reference position is included in the mask region.

On the right side of the person image 210B, the person image 210C is illustrated. In the person image 210C, a first reference point 213 is superimposed on the person image 210B. The reference position setting unit 116 sets the first reference point 213 by using the person image 210B. The first reference point 213 is a reference position being set at the foot of the person P1.

For example, the reference position setting unit 116 sets, as the first reference point 213, a midpoint of a straight line L1 connecting the right foot joint point K1 and the left foot joint point K2 of the person P1. Alternatively, for example, the reference position setting unit 116 sets, as the first reference point 213, an intersection point between the straight line L1 connecting the right foot joint point K1 and the left foot joint point K2 of the person P1, and a straight line L2 along a spine of the person P1. In this case, the determination unit 114 determines whether the first reference point 213 being set at the foot of the person P1 is included in the mask region.

Figure 10:
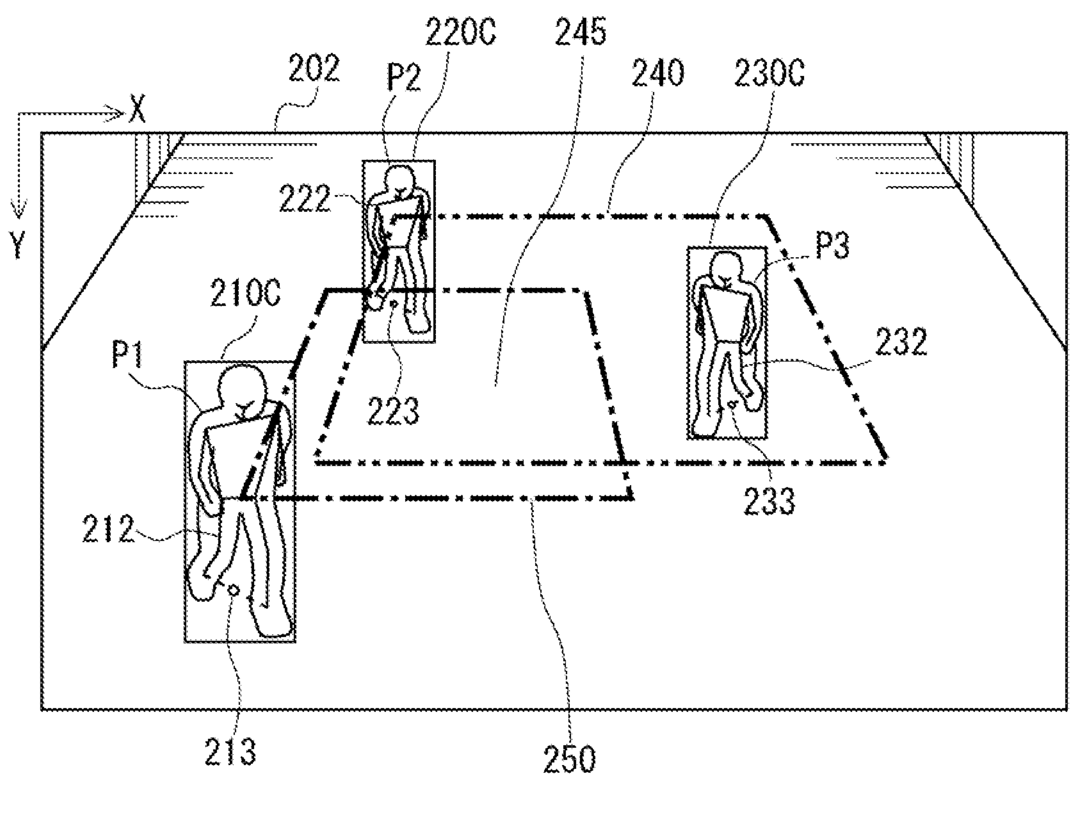
FIG. 10 is a diagram illustrating an example of a person image processed by the image processing apparatus according to the third example embodiment.

Next, a specific example of an image related to processing performed by the image processing apparatus 30 will be described with reference to FIG. 10. FIG. 10 is a diagram illustrating an example of an image processed by the image processing apparatus according to the third example embodiment. In FIG. 10, an image 202 is illustrated. Similarly to FIG. 6, the image 202 indicates a situation in which the person P1, a person P2, and a person P3 are walking. In addition, in the image 202, a first mask region 240 being set by the mask region setting unit 112 is indicated by a thick two-dot chain line. Further, in the image 202, a second mask region 250 being set by the mask region setting unit 112 is indicated by a thick dashed-dotted line. Herein, the first mask region 240 and the second mask region 250 include an overlapping region 245 that the first mask region 240 and the second mask region 250 overlap with each other.

An image of the person P1 included in the image 202 is the first person image 210C. The first person image 210C includes a circumscribed rectangle being set around the person P1. In addition, the first person image 210C includes the first body image 212 and the first reference point 213, as described in FIG. 9. Similarly, an image of the person P2 is a second person image 220C, and includes a circumscribed rectangle being set around the person P2, a second body image 222, and a second reference point 223. In addition, an image of the person P3 is a third person image 230C, and includes a circumscribed rectangle being set around the person P3, a third body image 232, and a third reference point 233.

In the image 202 illustrated in FIG. 10, the mask region setting unit 112 sets the first mask region 240 and the second mask region 250. In addition, the determination unit 114 determines, for the first mask region 240, whether a person image is included in the first mask region 240 according to a first condition. The first condition is that a circumscribed rectangle being a person image is included in the first mask region 240. In addition, the determination unit 114 determines, for the second mask region 250, whether a person image is included in the second mask region 250 according to a second condition different from the first condition. The second condition is that a reference position related to the person image is included in the second mask region 250.

The first person image 210C in FIG. 10 does not match the first condition or the second condition. Therefore, the first person image 210C is not a target of mask processing. The second person image 220C does not match the first condition, but matches the second condition. In addition, the third person image 230C matches the first condition, but does not match the second condition. Therefore, the second person image 220C and the third person image 230C are targets of mask processing. The processing unit 115 performs mask processing on the second person image 220C and the third person image 230C.

The third example embodiment has been described above. By including the body estimation unit 117, the image processing apparatus 30 can identify a joint point, a foot position, and the like of a person in a person image, and determine whether the identified position is included in a mask region. Therefore, according to the third example embodiment, it is possible to provide an image processing apparatus or the like that performs mask processing associated to a situation of a body of a person included in the mask region. In addition, the image processing apparatus 30 can set a plurality of mask regions, and set different determination conditions for each set mask region. Therefore, according to the third example embodiment, it is possible to provide an image processing apparatus or the like that can suitably set a condition for a mask region.

Example of Hardware Configuration

Hereinafter, a case where each functional component of an image processing apparatus according to the present disclosure is achieved by a combination of hardware and software will be described.

Figure 11:
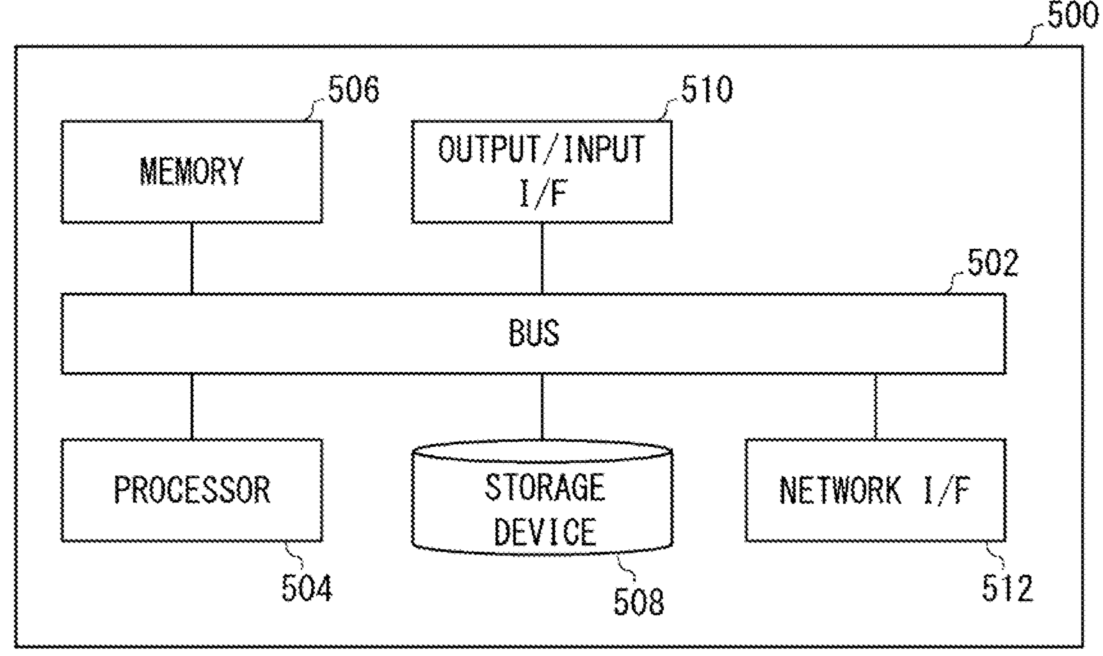
FIG. 11 is a block diagram illustrating a hardware configuration of a computer.

FIG. 11 is a block diagram illustrating a hardware configuration of a computer. The image processing apparatus according to the present disclosure can achieve the above-described function by a computer 500 including the hardware configuration illustrated in the figure. The computer 500 may be a portable computer such as a smartphone or a tablet terminal, or may be a stationary computer such as a PC. The computer 500 may be a dedicated computer designed in order to achieve each apparatus, or may be a general-purpose computer. The computer 500 can achieve a desired function by installing a predetermined application.

The computer 500 includes a bus 502, a processor 504, a memory 506, a storage device 508, an input/output interface (I/F) 510, and a network interface (I/F) 512. The bus 502 is a data transmission path through which the processor 504, the memory 506, the storage device 508, the input/output interface 510, and the network interface 512 transmit and receive data to and from one another. However, a method of mutually connecting the processor 504 and the like is not limited to bus connection.

The processor 504 is various processors such as a CPU, a GPU, or an FPGA. The memory 506 is a main storage apparatus achieved by using a random access memory (RAM) or the like.

The storage device 508 is an auxiliary storage apparatus achieved by using a hard disk, an SSD, a memory card, a read only memory (ROM), or the like. The storage device 508 stores a program for achieving a desired function. The processor 504 reads the program into the memory 506 and executes the program, and thereby achieves each functional component unit of each apparatus.

The input/output interface 510 is an interface for connecting the computer 500 and an input/output device. For example, an input apparatus such as a keyboard or an output apparatus such as a display apparatus is connected to the input/output interface 510.

The network interface 512 is an interface for connecting the computer 500 to a network.

Note that, the present invention is not limited to the above-described example embodiments, and can be appropriately modified without departing from the spirit.

Some or all of the above-described example embodiments may also be described as the following supplementary notes, but are not limited thereto.

(Supplementary note 1)

An image processing apparatus comprising:

- image data acquisition means for acquiring image data of a predetermined space captured by a camera;
- mask region setting means for setting a mask region in the space;
- identification means for identifying a person image being an image of a person included in the image data;
- body estimation means for estimating a body of the person, based on the person image;
- determination means for determining whether the body of the person with respect to the person image is included in the mask region; and
- processing means for performing processing of masking the person, based on a result of determination by the determination means.

(Supplementary note 2)

The image processing apparatus according to Supplementary note 1, wherein

- the image data acquisition means acquires a plurality of pieces of the image data generated at different times, and
- the identification means identifies the person image of the moving person, based on the plurality of pieces of the image data.

(Supplementary note 3)

The image processing apparatus according to Supplementary note 1 or 2, wherein the identification means identifies the person image via a learner that identifies the extracted image data as the person image.

(Supplementary note 4)

The image processing apparatus according to Supplementary note 3, wherein the identification means identifies the person image via the learner including a neural network having a multilayer structure.

(Supplementary note 5)

The image processing apparatus according to any one of Supplementary notes 1 to 4, wherein

- the identification means identifies a circumscribed rectangle being in contact with an outside of the person, and
- the determination means determines whether the circumscribed rectangle is included in the mask region.

(Supplementary note 6)

The image processing apparatus according to Supplementary note 5, further comprising reference position setting means for setting a reference position with respect to the person image, wherein the reference position setting means sets the reference position at a predetermined position of the circumscribed rectangle, and the determination means determines whether the reference position is included in the mask region.

(Supplementary note 7)

The image processing apparatus according to Supplementary note 1, wherein the body estimation means estimates, based on the person image, a body by complementing the body of the person not included in the person image.

(Supplementary note 8)

The image processing apparatus according to Supplementary note 7, further comprising reference position setting means for setting a reference position with respect to the person image, wherein the reference position setting means sets, based on information of the body, the reference position at a predetermined portion in the person.

(Supplementary note 9)

The image processing apparatus according to Supplementary note 8, wherein the reference position setting means sets, based on information of the body, the reference position at a foot of the person.

(Supplementary note 10)

The image processing apparatus according to Supplementary note 8, wherein the reference position setting means sets, based on information of the body, the reference position including an intersection point between a straight line connecting a right foot and a left foot of the person, and a straight line along a spine of the person.

(Supplementary note 11)

The image processing apparatus according to Supplementary note 8, wherein the body estimation means estimates a joint point of the person, based on the person image, and the reference position setting means sets the predetermined joint point as the reference position.

(Supplementary note 12)

The image processing apparatus according to any one of Supplementary notes 1 to 11, wherein the mask region setting means sets the mask region in a virtual horizontal plane being set to a predetermined height in the space.

(Supplementary note 13)

The image processing apparatus according to Supplementary note 12, wherein the mask region setting means estimates a floor surface in the space, and sets the mask region on the floor surface.

(Supplementary note 14)

The image processing apparatus according to any one of Supplementary notes 1 to 13, wherein the mask region setting means sets a first mask region, and a second mask region different from the first mask region, the determination means determines, for the first mask region, whether the person image is included in the first mask region according to a predetermined first condition, and determines, for the second mask region, whether the person image is included in the second mask region according to a second condition different from the first condition.

(Supplementary note 15)

An image processing method comprising, by a computer:

acquiring image data of a predetermined space captured by a camera;

setting a mask region in the space;

identifying a person image being an image of a person included in the image data;

estimating a body of the person, based on the person image;

performing determination on whether the body of the person with respect to the person image is included in the mask region; and performing processing of masking the person, based on a result of the determination.

(Supplementary note 16)

A non-transitory computer-readable medium storing a program causing a computer to execute an image processing method including:

processing of acquiring image data of a predetermined space captured by a camera;

processing of setting a mask region in the space;

processing of identifying a person image being an image of a person included in the image data;

processing of estimating a body of the person, based on the person image;

processing of performing determination on whether the body of the person with respect to the person image is included in the mask region; and processing of performing processing of masking the person, based on a result of the determination.

This application is based upon and claims the benefit of priority from Japanese patent application No. 2020-206707, filed on Dec. 14, 2020, the disclosure of which is incorporated herein in its entirety by reference.

REFERENCE SIGNS LIST

1 IMAGE PROCESSING SYSTEM
10 IMAGE PROCESSING APPARATUS
20 IMAGE PROCESSING APPARATUS
30 IMAGE PROCESSING APPARATUS
111 IMAGE DATA ACQUISITION UNIT
112 MASK REGION SETTING UNIT
113 IDENTIFICATION UNIT
114 DETERMINATION UNIT
115 PROCESSING UNIT
116 REFERENCE POSITION SETTING UNIT
117 BODY ESTIMATION UNIT
200 DISPLAY
201 IMAGE
210 FIRST PERSON IMAGE
211 FIRST REFERENCE POINT
212 FIRST BODY IMAGE
213 FIRST REFERENCE POINT
220 SECOND PERSON IMAGE
221 SECOND REFERENCE POINT
222 SECOND BODY IMAGE
223 SECOND REFERENCE POINT
230 THIRD PERSON IMAGE
231 THIRD REFERENCE POINT
232 THIRD BODY IMAGE
233 THIRD REFERENCE POINT
240 FIRST MASK REGION
250 SECOND MASK REGION
300 CAMERA
500 COMPUTER
900 FACILITY

N1 NETWORK
P1 PERSON
P2 PERSON
P3 PERSON

What is claimed is:

1. A non-transitory computer-readable medium storing a program causing a computer to execute an image processing method including:
 controlling to acquire a first image of a predetermined space;
 controlling to receive a mask region for masking a person included in the first image;
 controlling to identify a person image included in the first image;
 controlling to determine whether at least a part of the person image is included in the mask region; and
 controlling to mask the person in the first image based on a result of the determination.

2. The non-transitory computer-readable medium storing a program causing a computer to execute an image processing method according to claim 1 further including:
 controlling to estimate a position of a head portion of the person.

3. The non-transitory computer-readable medium storing a program causing a computer to execute an image processing method according to claim 1 further including:
 controlling to identify a position of the person included in the first image based on a feature amount of an object included in the first image,
 wherein the controlling to mask the person is configured to mask the person based on the position of the person.

4. The non-transitory computer-readable medium storing a program causing a computer to execute an image processing method according to claim 1 wherein the controlling to mask the person includes controlling to fill the person shown in the mask region in the first image.

5. The non-transitory computer-readable medium storing a program causing a computer to execute an image processing method according to claim 1 wherein the controlling to mask the person is configured to mask the person shown in the first image based on a difference between the first image and a second image captured at an earlier time than the first image.

6. The non-transitory computer-readable medium storing a program causing a computer to execute an image processing method according to claim 5 wherein the first image is an image acquired within a predetermined time after the second image is captured.

7. An image processing method comprising:
 controlling to acquire a first image of a predetermined space;
 controlling to receive a mask region for masking a person included in the first image;
 controlling to identify a person image included in the first image;
 controlling to determine whether at least a part of the person image is included in the mask region; and
 controlling to mask the person in the first image based on a result of the determination.

8. The image processing method according to claim 7 further comprising:
 controlling to estimate a position of a head portion of the person.

9. The image processing method according to claim 7 further comprising:
 controlling to identify a position of the person included in the first image based on a feature amount of an object included in the first image,
 wherein the controlling to mask the person is configured to mask the person based on the position of the person.

10. The image processing method according to claim 7
 wherein the controlling to mask the person includes controlling to fill the person shown in the mask region in the first image.

11. The image processing method according to claim 7
 wherein the controlling to mask the person is configured to mask the person shown in the first image based on a difference between the first image and a second image captured at an earlier time than the first image.

12. The image processing method according to claim 11 wherein
 the first image is an image acquired within a predetermined time after the second image is captured.

13. A system for processing images captured by a camera, comprising,
 at least one memory storing instructions and
 at least one processor configured to execute the instructions to:
  acquire a first image of a predetermined space;
  receive a mask region for masking a person included in the first image;
  identify a person image included in the first image;
  determine whether at least a part of the person image is included in the mask region; and
  mask the person in the first image based on a result of the determination.

14. The system for processing images according to claim 13,
 wherein the at least one processor is further configured to execute the instructions to:
 estimate a position of a head portion of the person.

15. The system for processing images according to claim 13,
 wherein the at least one processor is further configured to execute the instructions to: identify a position of the person included in the first image based on a feature amount of an object included in the first image, and
 mask the person based on the position of the person.

16. The system for processing images according to claim 13 wherein the at least one processor is further configured to execute the instructions to control to fill the person shown in the mask region in the first image.

17. The system for processing images according to claim 13 wherein the at least one processor is further configured to execute the instructions to mask the person shown in the first image based on a difference between the first image and a second image captured at an earlier time than the first image.

18. The system for processing images according to claim 17 wherein the first image is an image acquired within a predetermined time after the second image is captured.

* * * * *